(12) United States Patent
Ward (10) Patent No.: US 6,505,714 B1
(45) Date of Patent: Jan. 14, 2003

(54) PARKING-BRAKING IN VEHICLES (75) Inventor: Andrew John Ward, Gwent (GB)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/425,878

(22) Filed: Oct. 22, 1999

(51) Int. Cl.$^7$ .............................................. F16D 65/18

(52) U.S. Cl. ...................... 188/72.1; 188/156; 188/158; 188/72.6; 188/72.8; 188/162; 188/106 F; 188/106 P; 303/3; 303/20

(58) Field of Search .................................. 188/156, 157, 188/158, 162, 165, 72.1, 72.8, 72.9, 1.11, 2 D, 72.7, 106 P, 106 R, 106 F, 72.6; 303/3, 20, 13–18; 74/471 R, 479.01, 490.11, 490.12; 318/564, 685; 310/112

(56) References Cited

U.S. PATENT DOCUMENTS

| | | |
|---|---|---|
| 2,235,412 A | 3/1941 | Weiss |
| 3,684,049 A | 8/1972 | Kimura |
| 3,887,040 A | 6/1975 | Simon |
| 4,175,646 A | 11/1979 | Eikelberger |
| 4,400,039 A | 8/1983 | Ogata |
| 4,677,420 A | 6/1987 | Topic |
| 4,685,540 A | 8/1987 | Rath |
| 4,804,073 A * | 2/1989 | Taig et al. .................. 188/72.1 |
| 4,809,824 A * | 3/1989 | Fargier et al. ............... 188/162 |
| 4,850,459 A | 7/1989 | Johannesen |
| 4,995,483 A | 2/1991 | Moseley |
| 5,050,938 A | 9/1991 | Brearley |
| 5,127,495 A | 7/1992 | Verner |
| 5,148,894 A * | 9/1992 | Eddy, Jr. .................. 188/106 F |
| 5,158,160 A | 10/1992 | Doell |
| 5,161,650 A | 11/1992 | Taig |
| 5,310,251 A | 5/1994 | Towers |
| 5,348,123 A * | 9/1994 | Takahashi et al. .......... 188/72.1 |
| 5,370,449 A | 12/1994 | Edelen |
| 5,410,293 A | 4/1995 | Angerfors |
| 5,775,448 A | 7/1998 | Hirahara |
| 5,788,023 A | 8/1998 | Schoner |
| 5,807,205 A | 9/1998 | Odaka |
| 5,848,672 A | 12/1998 | Brearley |
| 5,949,168 A | 9/1999 | Dieckmann |
| 5,954,162 A | 9/1999 | Feigel |
| 5,957,246 A * | 9/1999 | Suzuki ....................... 188/72.1 |
| 5,975,250 A | 11/1999 | Brandmeier |
| 5,988,773 A | 11/1999 | Sawada |
| 6,000,507 A | 12/1999 | Bohm |
| 6,003,640 A | 12/1999 | Ralea |
| 6,012,556 A | 1/2000 | Blosch |
| 6,016,694 A | 1/2000 | Decker |
| 6,129,183 A | 10/2000 | Ward |
| 6,139,117 A | 10/2000 | Shirai |

FOREIGN PATENT DOCUMENTS

| | | |
|---|---|---|
| DE | 4327759 C2 | 7/1996 |
| DE | 19620344 | 8/1997 |
| DE | 19705105 A1 | 8/1997 |
| DE | 19653541 A1 | 6/1998 |
| DE | 19738877 A1 | 9/1998 |
| EP | 0789156 A1 | 8/1997 |
| EP | 995922 * | 10/1999 |
| EP | 0995657 A2 | 4/2000 |
| EP | 0995659 A1 | 4/2000 |
| EP | 0995923 A2 | 4/2000 |
| JP | 359086723 A | 5/1984 |
| JP | 359145659 A | 8/1984 |

(List continued on next page.)

*Primary Examiner*—Douglas C. Butler
(74) *Attorney, Agent, or Firm*—Carlson, Gaskey & Olds (57) ABSTRACT

A vehicle braking system having an operating member (103) by way of which a foundation braking force can be transmitted to a brake actuator in accordance with a driver's intentions, wherein there is provided a park brake mechanism (24) which provides the facility of electric motor driven actuation of the operating member (103) of the brake for the parking phase of braking.

15 Claims, 5 Drawing Sheets

FOREIGN PATENT DOCUMENTS

| | | | |
|---|---|---|---|
| JP | 4108058 | * | 4/1992 |
| JP | 7257356 | * | 10/1995 |
| JP | 7277157 | * | 10/1995 |
| JP | 8-127317 | | 5/1996 |
| JP | 9221010 | | 8/1997 |
| JP | 1024813 | * | 1/1998 |
| JP | 10024813 | | 1/1998 |
| WO | 9729292 | * | 8/1997 |
| WO | WO97/29297 | | 8/1997 |
| WO | WO97/29298 | | 8/1997 |
| WO | 9801682 | * | 1/1998 |
| WO | WO99/38738 | | 8/1999 |
| WO | WO99/48738 | | 9/1999 |

* cited by examiner

PARKING-BRAKING IN VEHICLES

The present invention relates to parking braking systems for vehicles having either conventional or electronically controlled braking systems (EBS).

The accepted approach to parking brakes in vehicles fitted with traditional pneumatic braking systems is to have a connection, either pneumatically, hydraulically or by a cable, between a manually operated actuating device, such as a lever or valve, and some form of braking device at the individual wheels. In heavy vehicles having pneumatically operated brakes, for example, this usually involves releasing the air supply to brake actuators at the wheels to enable the brakes to be applied by strong springs whose force is normally opposed by the air supply in non parking braking modes.

Figure 1:
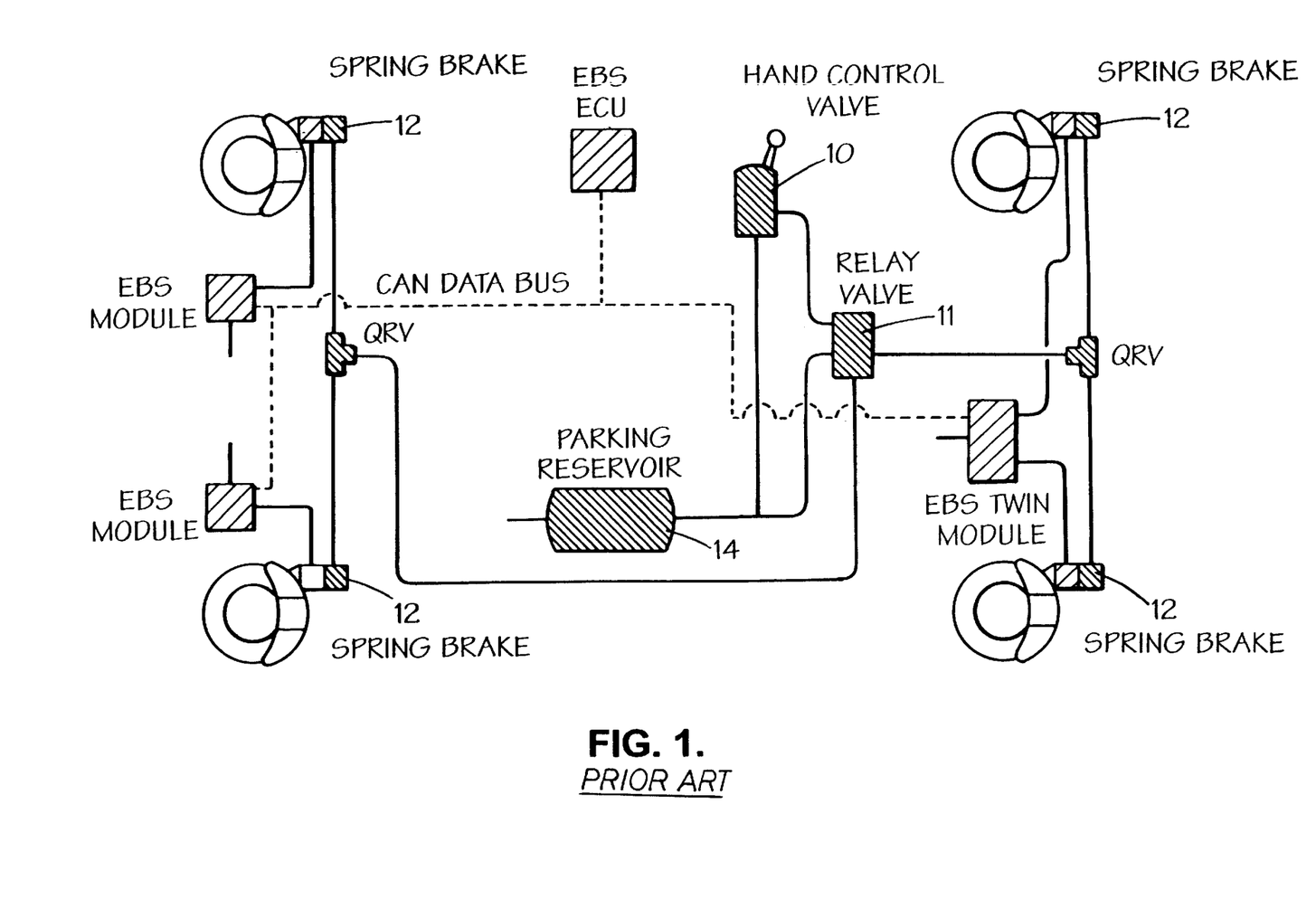
FIG. 1 is a diagrammatic illustration of an example of a conventional parking brake system in an EBS system.

This accepted approach to parking brakes in vehicles fitted with EBS uses spring brake actuators as shown diagrammatically in FIG. 1 of the accompanying drawings. In this system, a hand-operated valve 10 is used, via a relay valve 11, to allow the parking brake to be applied. The valve 10 operates on an inverse air principle in that it is arranged to release air pressure to allow the spring force of respective spring brake actuators 12 at each wheel to be applied. A suitable parking brake reservoir 14 is required to store the pressurised air for use within the system. Where the system is used with a vehicle having a trailer, a separate relay valve (not shown) is required to allow selective operation of the trailer brakes. When the driver operates the hand valve 10, an inverse pneumatic signal is produced, ie the pressure output from the valve 10 falls with increasing demand, This causes the spring brakes 12 to be applied since, in the normal running mode (no braking) the springs are held off by compressed air.

As evident from FIG. 1, the layout and construction of the conventional parking brake system requires the use of bulky spring actuators, a parking reservoir and associated pipework. All of these components require fitting and service which all adds to labour and material costs at the vehicle builders. Similar bulky spring actuators are usually also used in conventional pneumatic/mechanical (non-EBS) systems.

In accordance with the present invention, in a vehicle brake having an operating member by way of which a foundation braking force can be transmitted to a brake actuator in accordance with a driver's intentions, there is provided a park brake mechanism which provides the facility of electric motor driven actuation of the operating member of the brake for the parking phase of braking.

Preferably, the park brake mechanism comprises an electric-motor driven actuator, such as a cam surface or a wedge, whose displacement by the electric motor is arranged to cause sympathetic displacement of said operating member for applying/removing parking braking.

Advantageously, said electric-motor driven actuator engages directly with the operating member for displacing the operating member to achieve parking braking.

Preferably, in the case of the use of a cam surface, the cam surface is selectively rotatable by the electric motor and, in the case of the use of a wedge, the wedge is selectively linearly displaceable by the electric motor for displacing the operating member of the brake.

It will be appreciated that the use of the electric-motor driven actuator, such as the wedge or cam surface, enables the operating member to be driven from a condition of brakes-off up to a condition of fully parked load without the requirement of the foundation actuation system to firstly apply the brakes, ie the operation of the parking brake function can be independent of the foundation braking condition.

Advantageously, the cam surface or wedge is displaced by the electric motor via a gearbox.

By use of the present system, a park brake demand can be arranged to be applied at a steady rate over part of one or more seconds. Using a small, high speed motor and a suitable reduction gearbox which amplifies the torque applied, the wedge or cam in use for moving the operating member of the brake can move from zero to a prescribed park load within acceptable time limits. Once there, the power is removed from the actuator and by virtue of driving through a non-reversible drive, the brake becomes mechanically latched at the prescribed level. Release of the brake is simply a reversal of the application, down to a zero or clearance park condition.

As mentioned hereinbefore, the present system is not limited to uses within EBS systems but is equally applicable to conventional brake actuation systems fitted with parking signalling to the park latch system.

The invention is described further hereinafter, by way of example only, with reference to the accompanying drawings, in which.

The present invention is described further hereinafter principally in regard to EBS systems. However, it is emphasised that the invention is equally applicable to non EBS systems operated using traditional mechanical and pneumatic couplings between the driver-operated controls and the brakes.

Figure 2:
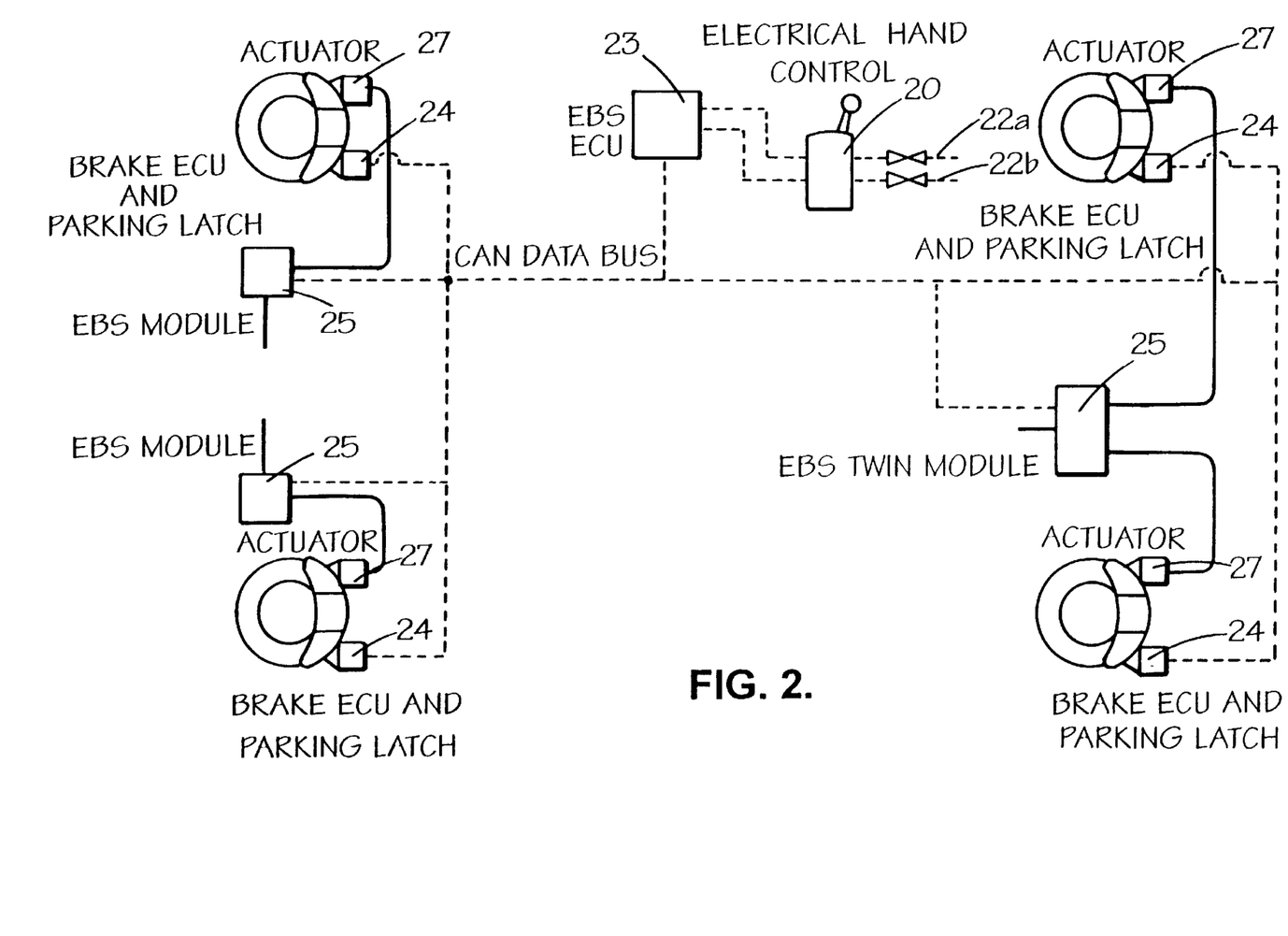
FIG. 2 is a diagrammatic illustration of an EBS system within which a park braking mechanism in accordance with the present invention can be incorporated.

Referring now to FIG. 2, the illustrated system comprises a hand control 20 containing two demand sensors (not shown) which are preferably potentiometers, powered by individual fused lines 22a, 22b, fed from a single source (not shown) such as the vehicle battery. The use of potentiometers enables the parking braking to be modulated via the vehicle EBS 23, 25 and has a "park" position into which the hand lever is arranged to be latched. Individual power wires, sensors and signal wires are used to provide redundancy, should a bad connection or other fault develop in one of the channels.

Parking brake mechanisms 24 are installed in each of the wheel brakes. These mechanisms 24 are used to establish a park braking condition when the hand control 20 is moved to the park position. In principle, the parking brake mechanisms 24 can be electrically or electro-pneumatically operated.

FIG. 2 shows schematically an EBS system applied to a vehicle having four braked wheels, two at the front and two at the rear. The forward wheels (on the left in FIG. 2) and rearward wheels (on the right) have brake actuators 27 which are selectively operated for normally braking by control signals generated electrically via a foot controlled transducer (not shown) and manipulated via the vehicle EBS. As indicated schematically in FIG. 2, the system also includes the park braking mechanisms 24 and local brake ECUs 25.

Figure 3:
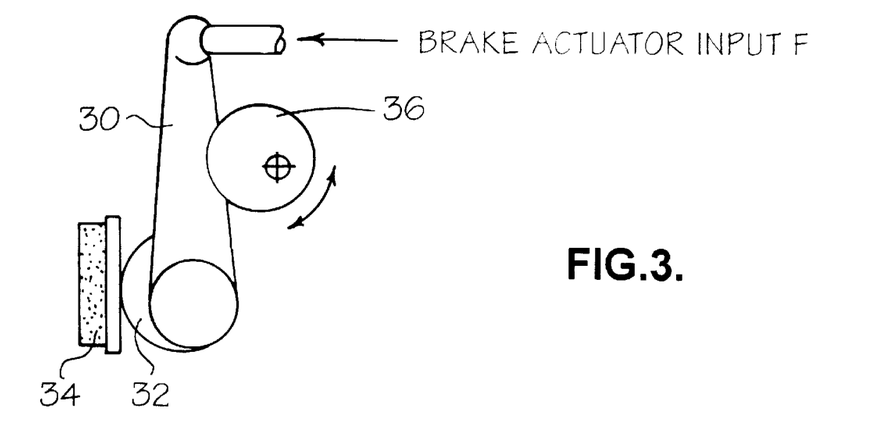
FIG. 3 is a diagrammatic illustration of a first embodiment of a park brake mechanism in accordance with the present invention.

FIG. 3 shows a basic system wherein a brake actuator input force F operates a operating lever 30 carrying a cam 32 for urging a brake pad 34 against a brake disc (not shown) for normal, non-parking braking purposes. In order to enable the brakes to be brought into and retained in a brakes-applied condition for parking braking, there is provided a second rotatable cam 36 whose surface engages with the operating lever 30, the cam 36 being drivable rotationally by a motor (not shown) and/or gearbox (not shown). The surface shape of the cam 36 is such that, without input from the normal brake actuator (F) on the lever 30, rotation of the cam 36 can itself displace the lever 30 selectively between a brakes-fully-off condition and a brakes-fully-on condition. It will be appreciated that this arrangement has the additional facility of allowing further adjustment of the park load during the parked condition, by additional rotation of the cam 36 in either direction. This facility enables adjustment to be made to deal with clamp load changes which result from changes in temperature. For example, it is known that as a brake cools, during the time that a vehicle may be parked after a journey, the brake geometry changes, and can change in such a way that if a fixed park load condition was implemented, the clamp force being applied could reduce as the brake geometry relaxes.

Figure 4:
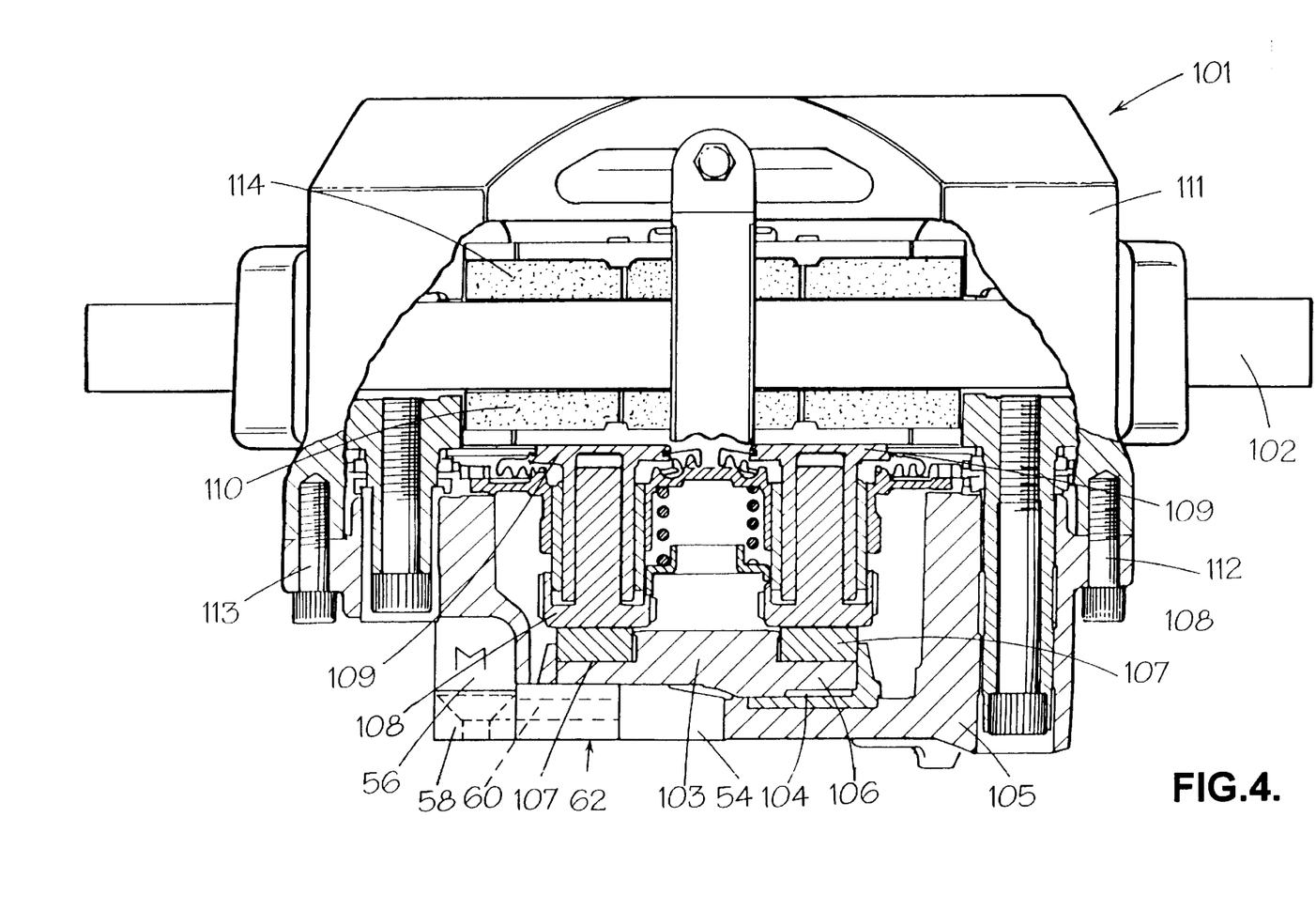
FIG. 4 is a sectional view through a braking device fitted with a second embodiment of a park braking mechanism in accordance with the present invention

FIG. 4 shows a preferred implementation where the cam of FIG. 3 has been replaced by a wedge 54 which is positioned through use of an electric motor 56, driving through a reduction gearbox 58 onto a lead screw 60 of a linear driver 62 which moves the wedge 54 linearly into and out of the desired park position. The use of a reduction gearbox allows the further use of a low power motor having a compact layout suitable for mounting integrally with the brake. Additionally, the reduction gearbox and lead screw arrangement provide a non-reversible "detent" which holds the wedge in position until further driven by the electric motor.

Figure 5:
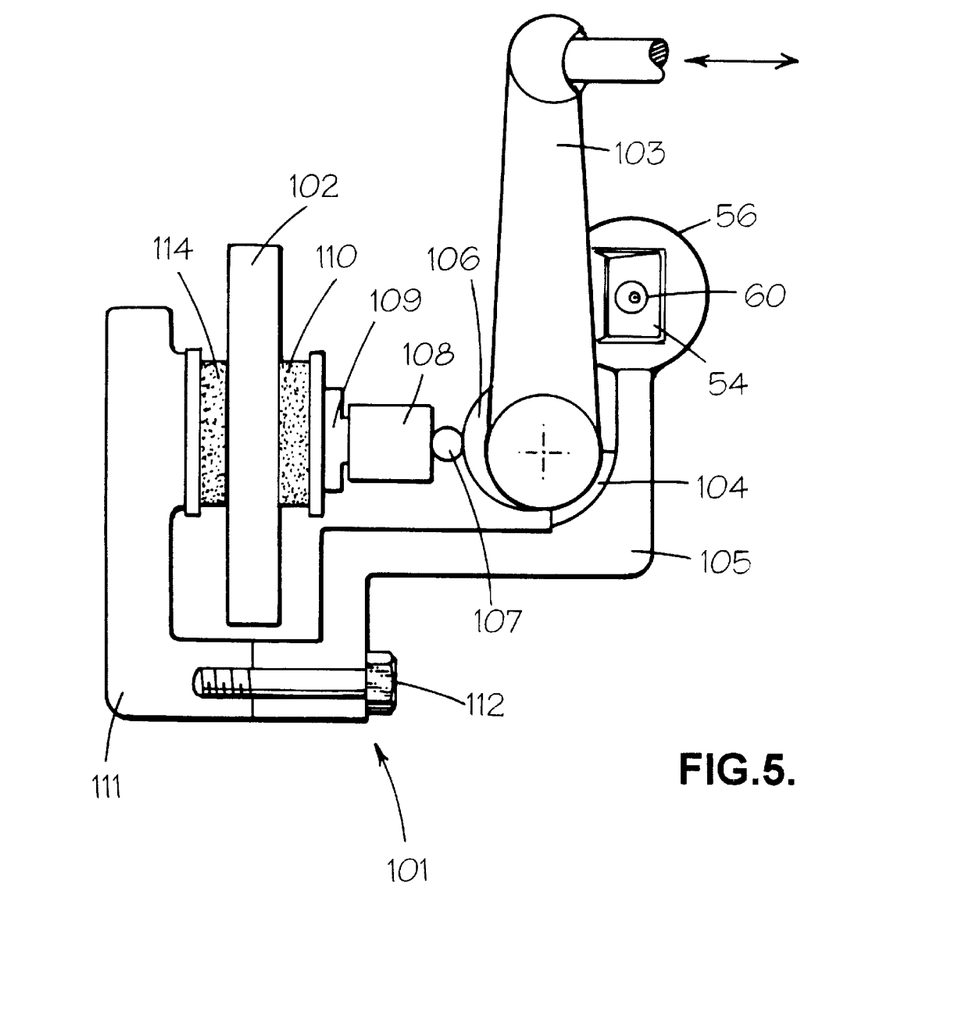
FIG. 5 illustrates the principle of operation of the park braking mechanism of FIG. 4.

FIG. 5 shows a simplified arrangement of the implementation shown in detail in FIG. 4 and having a motor-driven wedge 54.

Although not really necessary to an understanding of the present invention, there follows a brief explanation of the disc brake structure of FIG. 4 to which the motor driven wedge has been applied.

The disc brake of FIG. 4 comprises a housing 101 that straddles a disc 102 mounted on an axle of the vehicle to be braked (not shown). The brake is actuated by mechanical movement of an input actuator such as an air cylinder (not shown). Such actuators are well known in the field of brake actuation. The actuator cooperates with the outer end of the operating shaft or "op-shaft" 103 of the brake. The inner end of the op-shaft is carried in a bearing attached to the lower or inner housing part 105. Said inner end of the op-shaft 103 has formed on its outer surface a cam lobe 106 which upon rotation causes a reaction force to be transmitted to rollers 107. The rollers 107 in turn transmit the applied load to a pair of spaced inner tappet members 108. These inner tappet members 108, are screwed into engagement with associated outer tappet members 109 which apply the input load from the actuator to the rear of the inner braking lining 110, thus pressing the friction material of the inner braking lining 110 into frictional engagement with the disc 102. A reaction force is generated through this frictional engagement between the disc 102 and inner braking lining 110, that is fed back through the tappets 108 and 109, rollers 107 and cam lobe 106 which is supported by the inner housing part 105. The inner housing part 105 is secured to the outer housing part 111 by bridging bolts 112 and 113. Thus the applied force being generated by movement of the op-shaft 103 is ultimately transmitted by reaction means to the outer housing part 111 which in turn presses the outer brake lining 114 into frictional engagement with the disc 102. Therefore it will be appreciated that the disc 102, upon movement of the op-shaft 103, is clamped between inner and outer friction linings 110 and 114 to generate a braking force for braking the vehicle under control for the applied input movement.

Figure 6:
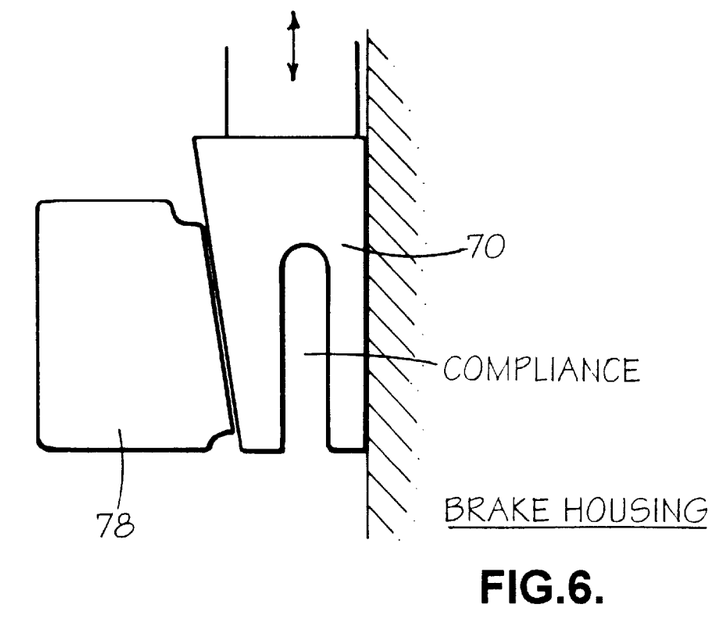
FIGS. 6 and 7 are diagrammatic illustrations of two means of introducing compliance in embodiments using a wedge.
Figure 7:
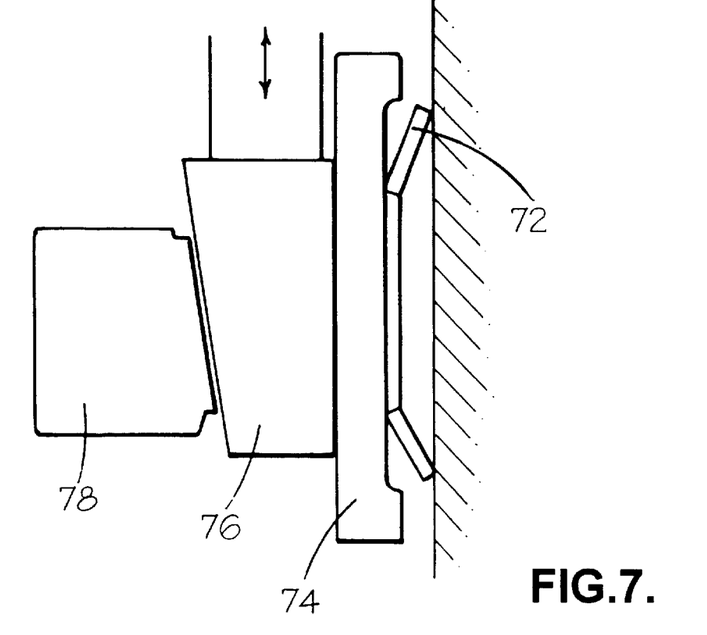

Reference is now made to FIGS. 6 and 7 which illustrate particular embodiments of the wedge version of the actuator wherein a means is included to enable an amount of mechanical compensation for dimensional changes within the brake during cooling. This is achieved by the inclusion of a stiff but compliant form within the wedge that is able to support the park load reaction from the op-shaft but which is capable of "following" the op-shaft as the brake relaxes so as to substantially maintain the force applied thereto.

The compliance may be built into the wedge itself or may indeed be built into the support for the wedge. Conveniently, the wedge is as illustrated in FIG. 6 where the wedge 70 is substantially of a 'C' section in outline and formed in a material that, whilst compliant, is of relative high stiffness. Thus, as the park brake is engaged, the op-shaft compresses the wedge until a stable condition is achieved. As the brake cools, the brake dimensions alter which cause the op-shaft to move substantially away from the wedge but the wedge is able to follow over at least a short operating range, holding the park load at substantially the applied load condition.

In the embodiment of FIG. 7, the support surface for the wedge itself is formed from compliant means and has the same effect as in the embodiment of FIG. 6. In this case, the compliant means comprises a Belleville spring 72 which urges a support 74 against the wedge 76. The op-shaft is shown at 78.

To ensure that the integrity of the system is maintained, the parking function is preferably provided on at least two vehicle axles that are each controlled by discrete parts of the braking system, such as the front and rear circuits in a vertically split system.

When used in an EBS system, the hand control 20 works as a demand sensor, much the same as that installed in a conventional foot controlled valve. In practice, the logic would preferably be arranged such that whichever channel sets the high demand would win. When the control is moved to the park position, the brakes would be actuated by a high pressure, that is sufficient to provide the parking brake force necessary to at least meet the requirements of the braking regulations.

The brakes may also have multiple sensors and rapid running clearance take-up, so there would be an ECU installed, connected to the local EBS module over a data bus in an EBS equipped vehicle. This ECU would contain the drivers for the park brake mechanisms. If this ECU is not present, as would be the case with a brake having the addition of the parking feature only, it is possible to control the park brake mechanisms through direct wiring to the EBS module. In a conventional braking system, ie non-EBS, the park brake ECU would receive all sensor signals and control the operation of the foundation actuation system and the park brake mechanism drive.

What is claimed is:

1. A vehicle braking system comprising:
   an input shaft for receiving a brake input force wherein said input shaft has a first end for receiving said brake input force and a second end pivotally mounted for rotation about a first axis;
   a first actuation member co-operating with said input shaft for applying a foundation braking force, said first actuation member being associated with said second end of said input shaft;
   a second actuation member co-operating with said input shaft for applying a parking brake force; and
   an electric motor for driving said second actuation member to selectively apply said parking brake force.

2. A braking system as claimed in claim 1, wherein said first actuation member comprises a first cam that applies said foundation braking force to a brake pad support member when said brake input force is applied to said first end of said input shaft.

3. A braking system as claimed in claim 2, wherein said first cam is formed on said second end of said input shaft.

4. A braking system as claimed in claim 2, wherein said second actuation member is a second cam directly engageable with said input shaft at a location between said first and second ends and which is selectively driven by said motor to displace said input shaft to apply said parking brake force.

5. A braking system as claimed in claim 4, wherein said second cam is rotatable about a second axis that is spaced apart from and parallel to said first axis.

6. A braking system as claimed in claim 1, wherein said second actuation member is a wedge directly engageable with said input shaft and which is selectively driven by said motor to displace said input shaft to apply said parking brake force.

7. A braking system as claimed in claim 6, wherein said wedge is selectively linearly displaceable by said motor to engage said input shaft.

8. A braking system as claimed in claim 7 including a gearbox driven by said motor for displacing said wedge.

9. A braking system as claimed in claim 6, wherein said wedge is comprised of a compliant material that is initially compressible as said wedge engages said shaft to apply said parking brake force and which rebounds to maintain the applied parking brake force as brake cooling occurs.

10. A braking system as claimed in claim 9, wherein said wedge has a C-shaped cross-section with a first leg in engagement with said input shaft and a second leg in engagement with a brake structure, said first and second legs being spaced apart from one another to provide compliance.

11. A braking system as claimed in claim 6, including a resilient member positioned between said wedge and a brake structural member that is initially compressible as said wedge engages said shaft to apply said parking brake force and which rebounds to maintain the applied parking brake force as brake cooling occurs.

12. A braking system as claimed in claim 11, wherein said resilient member is a Belleville spring.

13. A braking system as claimed in claim 11, including a support member reacting between said resilient member and said wedge.

14. A braking system as claimed in claim 1 having electronically controlled foundational braking.

15. A braking system as claimed in claim 1 having non-electronically controlled foundational braking.

* * * * *

UNITED STATES PATENT AND TRADEMARK OFFICE
CERTIFICATE OF CORRECTION

PATENT NO.      : 6,505,714 B1
DATED           : January 14, 2003
INVENTOR(S)     : Ward It is certified that error appears in the above-identified patent and that said Letters Patent is hereby corrected as shown below:

<u>Title page,</u>
Please add the following:

-- [30]     Foreign Application Priority Data

Oct. 24, 1998   (UK) …………………………..98232000.2 --

Signed and Sealed this

First Day of July, 2003

JAMES E. ROGAN
*Director of the United States Patent and Trademark Office*